United States Patent
Okamoto et al.

(10) Patent No.: US 11,754,197 B2
(45) Date of Patent: Sep. 12, 2023

(54) GAS SOLENOID VALVE

(71) Applicant: KAWASAKI JUKOGYO KABUSHIKI KAISHA, Kobe (JP)

(72) Inventors: Masayoshi Okamoto, Kobe (JP); Makoto Ninomiya, Kobe (JP); Hiroshi Yamashita, Kobe (JP); Noritaka Nakamura, Kobe (JP); Yuki Kato, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 108 days.

(21) Appl. No.: 17/426,415

(22) PCT Filed: Jan. 28, 2020

(86) PCT No.: PCT/JP2020/002970
§ 371 (c)(1),
(2) Date: Jul. 28, 2021

(87) PCT Pub. No.: WO2020/158729
PCT Pub. Date: Aug. 6, 2020

(65) Prior Publication Data
US 2022/0099210 A1    Mar. 31, 2022

(30) Foreign Application Priority Data
Jan. 31, 2019   (JP) ................. 2019-015886

(51) Int. Cl.
| F16K 31/06 | (2006.01) |
| F16K 1/52 | (2006.01) |
| F16K 31/122 | (2006.01) |
| F16K 31/42 | (2006.01) |
| F16K 47/02 | (2006.01) |
| F16K 1/30 | (2006.01) |

(52) U.S. Cl.
CPC .......... F16K 31/0655 (2013.01); F16K 1/523 (2013.01); F16K 31/0696 (2013.01);
(Continued)

(58) Field of Classification Search
CPC .......... F16K 1/301; F16K 1/523; F16K 31/06; F16K 31/0655; F16K 31/0693;
(Continued)

(56) References Cited

U.S. PATENT DOCUMENTS

| 3,100,103 A | 8/1963 | Bullard |
| 5,048,790 A | 9/1991 | Wells |

(Continued)

FOREIGN PATENT DOCUMENTS

| JP | S59073678 A | 4/1984 |
| JP | H07035874 U | 7/1995 |

(Continued)

*Primary Examiner* — Matthew W Jellett
(74) *Attorney, Agent, or Firm* — Alleman Hall Creasman & Tuttle LLP (57) ABSTRACT

A gas solenoid valve includes: a housing including a first port, a second port, and a valve port leading to the first port and the second port; a main valve body capable of moving between a closed position thereof closing the valve port and an open position thereof opening the valve port and configured to move in an opening direction from the closed position to the open position by pressure of gas supplied through the first port; a biasing member that provides a biasing force acting in a closing direction to the main valve body to position the main valve body in the closed position; and an electromagnetic drive device that generates an excitation force opposing the biasing force of the biasing member to cause the main valve body to move to the open position. A damping chamber in the housing dampens movement of the main valve body.

3 Claims, 7 Drawing Sheets

(52) U.S. Cl.
CPC .......... *F16K 31/1226* (2013.01); *F16K 31/42* (2013.01); *F16K 47/02* (2013.01); *F16K 1/301* (2013.01)

(58) Field of Classification Search
CPC .. F16K 31/0696; F16K 31/1226; F16K 31/42; F16K 31/408; F16K 47/02
USPC .......................................... 251/30.04, 48–55
See application file for complete search history.

(56) References Cited

U.S. PATENT DOCUMENTS

| | | | |
|---|---|---|---|
| 5,735,582 A * | 4/1998 | Eith ...................... | B60T 8/4872 251/30.01 |
| 6,209,970 B1 | 4/2001 | Kamiya et al. | |
| 6,443,420 B1 * | 9/2002 | Hettinger .............. | F16K 39/024 251/38 |
| 9,347,580 B2 * | 5/2016 | Ninomiya ........... | F16K 31/0675 |
| 9,929,417 B2 * | 3/2018 | Nakamura ........ | H01M 8/04089 |
| 10,006,559 B2 * | 6/2018 | Kubo ................ | F16K 31/408 |
| 2013/0175462 A1 * | 7/2013 | Suzuki ................. | F16K 39/024 251/30.01 |

FOREIGN PATENT DOCUMENTS

| | | |
|---|---|---|
| JP | H09292049 A | 11/1997 |
| JP | H11218257 A | 8/1999 |
| JP | 2003222261 A | 8/2003 |
| JP | 2014234912 A | 12/2014 |

\* cited by examiner

GAS SOLENOID VALVE

TECHNICAL FIELD

The present invention relates to gas solenoid valves that are electromagnetically-driven on/off valves.

BACKGROUND ART

Gas solenoid valves are provided to open and close channels through which gas flows; as an example, a solenoid valve such as that disclosed in Patent Literature (PTL 1) is known.

CITATION LIST

Patent Literature

PTL 1: Japanese Laid-Open Patent Application Publication No. 2003-222261

SUMMARY OF INVENTION

Technical Problem

For example, there are cases where a solenoid valve is provided on a gas tank, and the solenoid provided on the gas tank is used as follows. Specifically, in the case of filling the gas tank with gas, gas pressure causes a main valve to be lifted off a valve seat, thus opening a channel. At this time, chattering occurs at the main valve, etc., causing various problems such as noise, damage to a seat, and contamination attributable to wear and tear.

Thus, the present invention has an object to provide a gas solenoid valve in which the occurrence of chattering at a main valve body is minimized.

Solution to Problem

A gas solenoid valve according to the present invention includes: a housing including a first port, a second port, and a valve port leading to the first port and the second port; a main valve body capable of moving between a closed position and an open position and configured to move in an opening direction by pressure of gas supplied through the first port, the closed position being a position of the main valve body closing the valve port, the open position being a position of the main valve body opening the valve port; a biasing member that provides a biasing force to the main valve body to position the main valve body in the closed position, the biasing force acting in a closing direction from the open position to the closed position; and an electromagnetic drive device that generates an excitation force to cause the main valve body to move to the open position, the excitation force opposing the biasing force of the biasing member. A damping chamber is formed in the housing to damp movement of the main valve body.

According to the present invention, with the damping chamber, movement of the main valve body can be restricted, in other words, vibrations of the main valve body can be damped. This makes it possible to minimize the occurrence of chattering at the main valve body.

In the above-described invention, it is preferable that the gas solenoid valve further include a seat piston that is inserted through the main valve body, receives the biasing force of the biasing member, and biases the main valve body to the closed position, a pilot passage connecting the first port and the second port be formed in the main valve body, the seat piston be capable of moving between a pilot closed position thereof closing the pilot passage and a pilot open position thereof opening the pilot passage, the electromagnetic drive device generate the excitation force to cause the seat piston to move to the pilot open position, to cause the main valve body to move to the open position, the damping chamber be formed in a position located in the opening direction from the seat piston and adjacent to the seat piston, and the biasing member be disposed in the damping chamber.

According to the above configuration, a chamber in which the biasing member is housed is used as the damping chamber, meaning that there is no need to form another damping chamber to damp vibrations of the main valve body. Therefore, it is possible to avoid an increase in the size of the gas solenoid valve.

In the above-described invention, it is preferable that the electromagnetic drive device include: a plunger through which the seat piston is inserted in a manner to be movable in conjunction; a stationary pole disposed facing the plunger; and a solenoid that provides the excitation force to the plunger to attract the plunger to the stationary pole, and the damping chamber be formed in the plunger to position the biasing member between the seat piston and the stationary pole, and gas be introduced into and discharged from the damping chamber through a gap between the seat piston and the plunger.

According to the above configuration, the amount of gas to be introduced into and discharged from the damping chamber is limited using the gap, and thus it is possible to minimize abrupt changes in the volume of the damping chamber, minimizing vibrations of the main valve body, in other words, minimizing the occurrence of chattering at the main valve body.

Furthermore, the amount of gas to be introduced into and discharged from the damping chamber can be changed according to the width of the gap, and thus it is possible to adjust the damping force of the damping chamber according to the width of the gap. Therefore, by adjusting the width, it is possible to minimize the occurrence of chattering at the main valve body more effectively.

In the above-described invention, it is preferable that the gas solenoid valve further include a stopper that limits an amount of movement of the main valve body in the opening direction.

According to the above configuration, it is possible to minimize damage to a biasing member that occurs due to excessive stroke of the main valve body.

Advantageous Effects of Invention

With the present invention, it is possible to minimize the occurrence of chattering at the main valve body.

The above object, other objects, features, and advantages of the present invention will be made clear by the following detailed explanation of preferred embodiments with reference to the attached drawings.

DESCRIPTION OF EMBODIMENTS

Hereinafter, a gas solenoid valve 1 according to the present embodiment of the present invention will be described with reference to the drawings. Note that the concept of directions mentioned in the following description is used for the sake of explanation and is not intended to limit the orientations, etc., of elements according to the present invention to these directions. The gas solenoid valve 1 described below is merely one embodiment of the present invention. Thus, the present invention is not limited to the embodiment and may be subject to addition, deletion, and alteration within the scope of the essence of the present invention.

Embodiment 1

Figure 1:
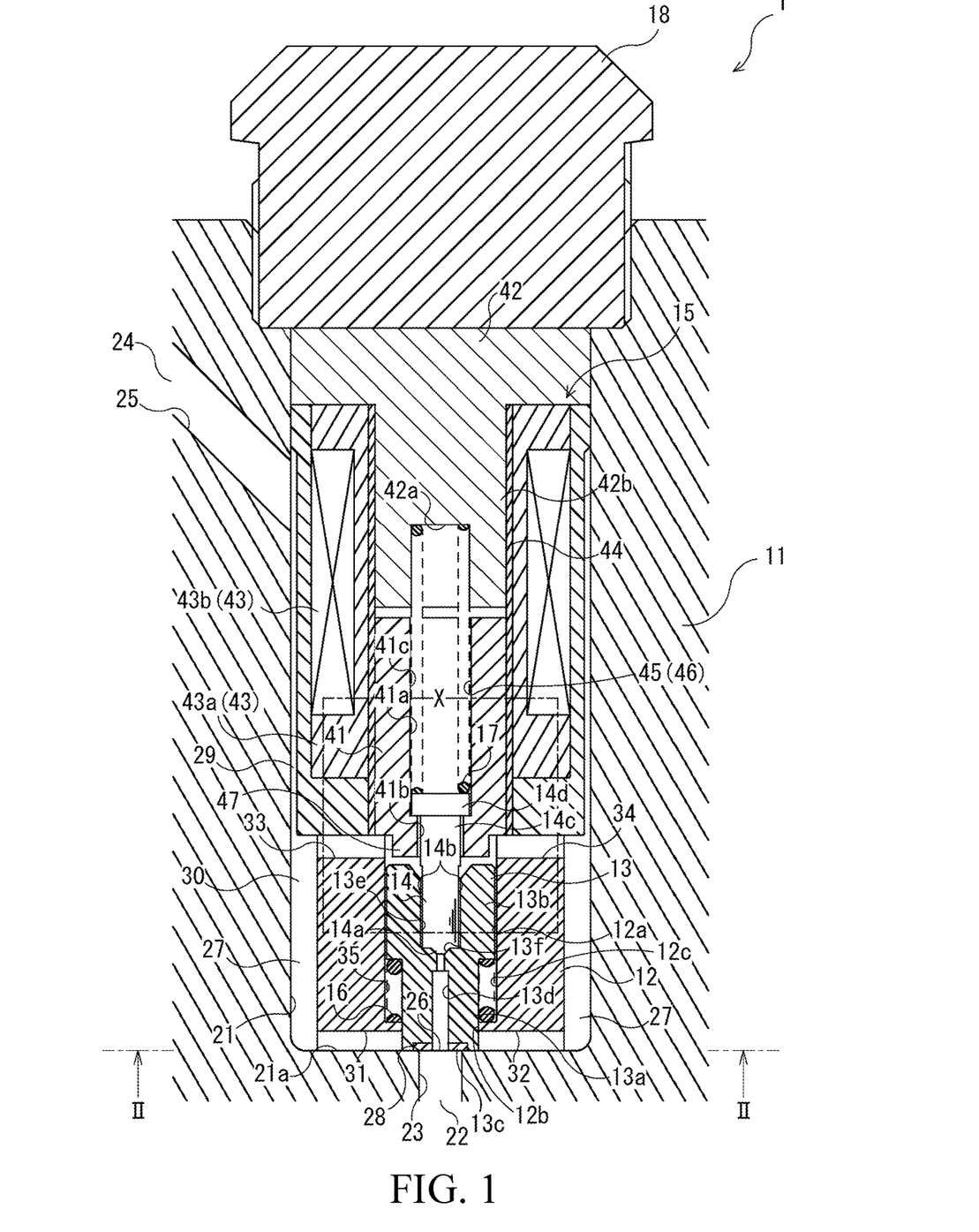
FIG. 1 is a cross-sectional view of a gas solenoid valve according to Embodiment 1 of the present invention.

A gas solenoid valve 1 illustrated in FIG. 1 is provided on a gas tank or the like that can hold a high pressure gas, and the gas solenoid valve 1 enables gas filling and discharge by opening and closing a channel. Note that the gas tank is one example for which the gas solenoid valve 1 is used, and a subject for which the gas solenoid valve 1 is used is not necessarily limited to the gas tank. Specifically, the gas solenoid valve 1 is provided in a channel required to allow gas to flow in both directions. The gas solenoid valve 1 having such a function is configured as follows.

Specifically, the gas solenoid valve 1 mainly includes a housing 11, a guide member 12, a main valve body 13, a seat piston 14, and an electromagnetic drive device 15. In the housing 11, a valve chamber 21 in the approximate shape of a circular column having a closed end is formed, and an opening part of the valve chamber 21 is covered by a lid body 18. Furthermore, a first channel 23 leading to a first port 22 and a second channel 25 leading to a second port 24 are formed in the housing 11. The first channel 23 is open at a bottom 21a of the valve chamber 21 via a valve port 26, and the second channel 25 is open in a side surface of the valve chamber 21. The housing 11 configured as just described houses the guide member 12, the main valve body 13, the seat piston 14, and the electromagnetic drive device 15 in the valve chamber 21 in order to open and close the valve port 26.

Figure 2:
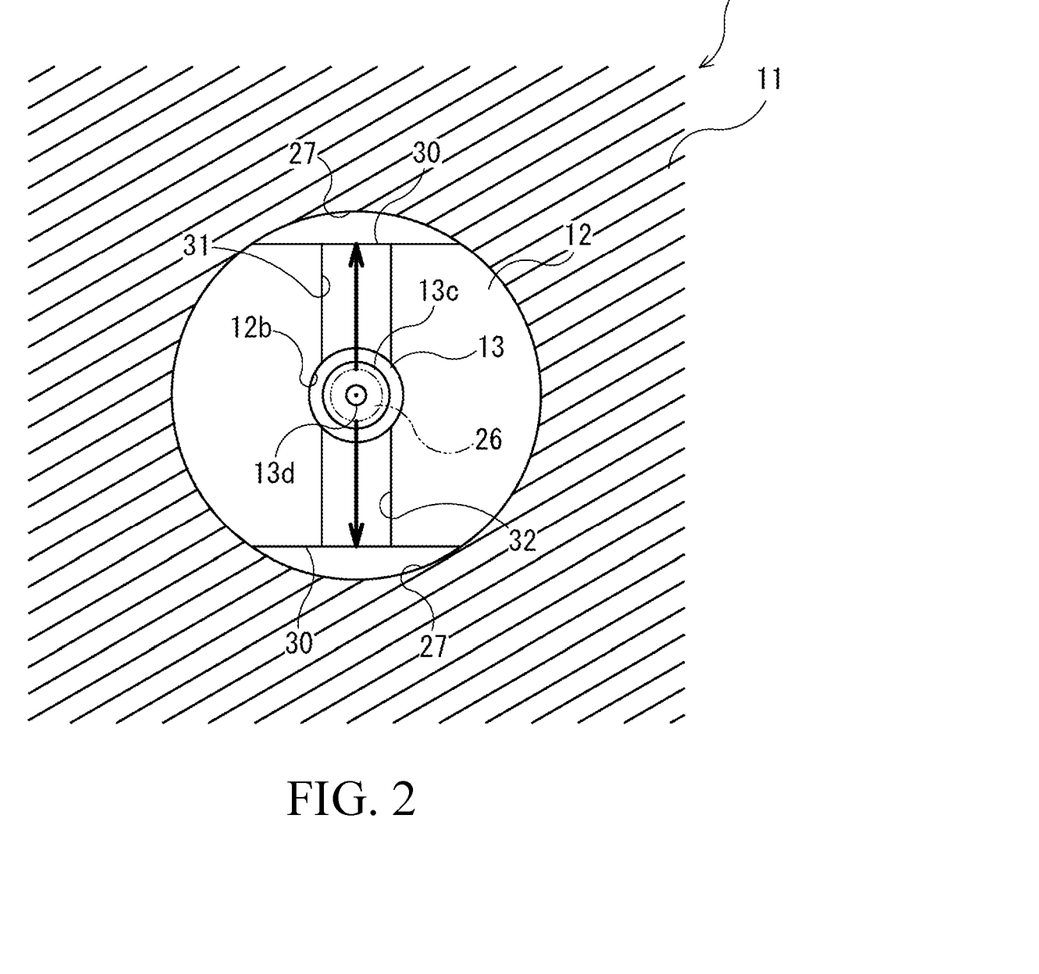
FIG. 2 is an enlarged cross-sectional view of the gas solenoid valve taken along cutting plane line II-II in FIG. 1.
Figure 3:
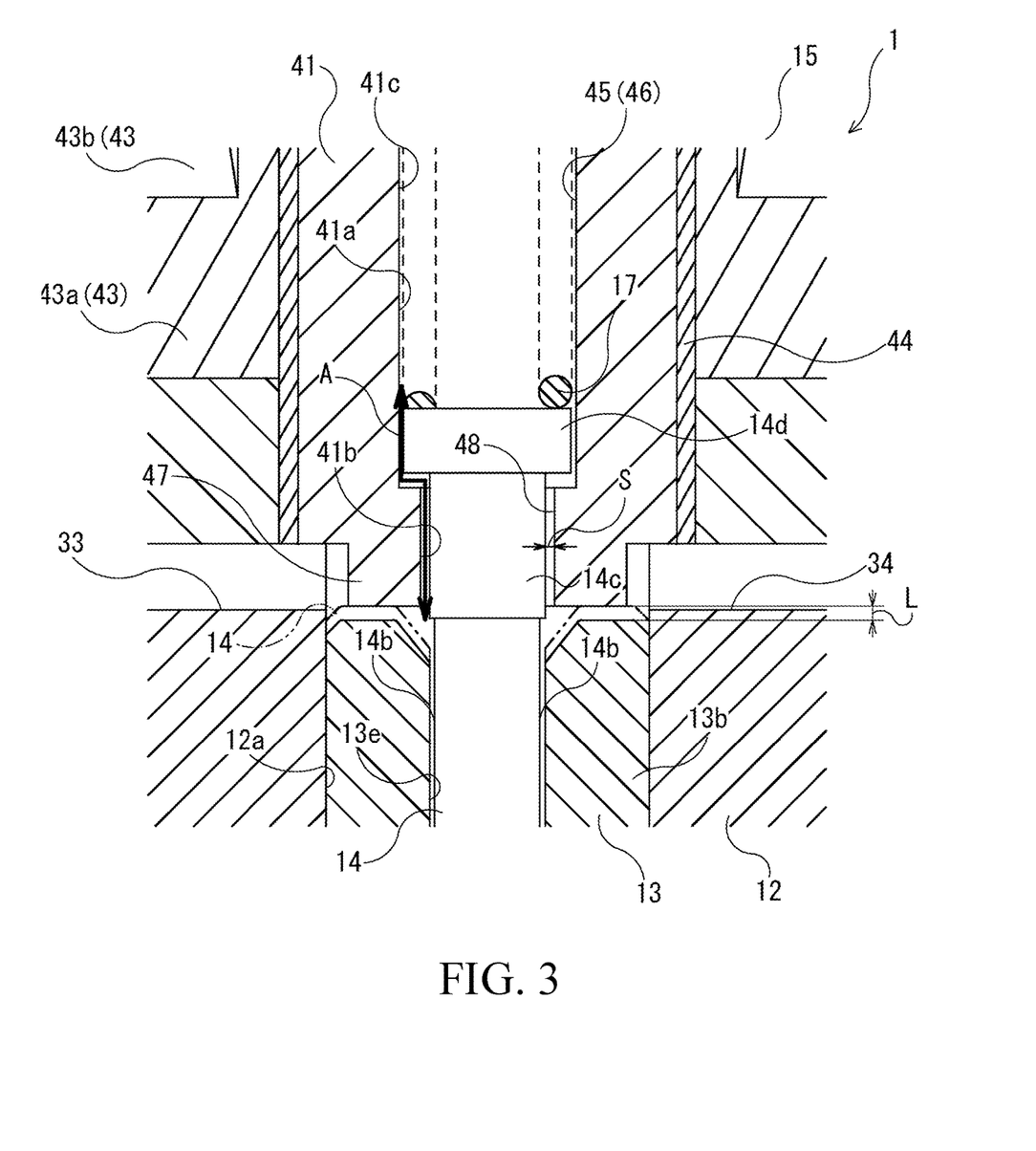
FIG. 3 is an enlarged cross-sectional view of a region X, which is illustrated in FIG. 1, of the gas solenoid valve with a seat piston pushed up by a main valve body.

The guide member 12 is formed in the approximate shape of a circular cylinder, and at least a portion of the outer peripheral surface of the guide member 12 (in the present embodiment, two portions separated from each other by 180 degrees in the peripheral direction) is formed to be flat. The guide member 12 shaped as just described fits into the valve chamber 21 with one end in contact with the bottom 21a of the valve chamber 21, and forms one pair of gaps 27, 27 with the housing 11. Furthermore, two communication channels 31, 32 are formed at one end of the guide member 12, as illustrated in FIG. 2. The two communication channels 31, 32 extend in opposite directions along the radius of an inner hole 12a of the guide member 12 and connect the valve port 26 and the gaps 27, 27. Similarly, two communication channels 33, 34 are formed at the other end of the guide member 12, and the gaps 27, 27 and the inner hole 12a of the guide member 12 are connected by communication channels 33, 34. Furthermore, the main valve body 13 is inserted into the inner hole 12a, as illustrated in FIG. 3.

The main valve body 13 is formed in the approximate shape of a circular cylinder having a closed end with a base end portion 13b larger in diameter than a leading end portion 13a. The base end portion 13b of the main valve body 13 shaped as just described fits into the inner hole 12a and can move axially along the inner hole 12a of the guide member 12. Furthermore, the main valve body 13 can be in a closed position such as that illustrated in FIG. 1 and includes a seat member 13c on a leading end surface. When the main valve body 13 is in the closed position, the seat member 13c is seated on a valve seat 28, and thus the valve port 26 is closed. On the other hand, when the main valve body 13 is positioned in an open position by moving axially in the opposite direction, the seat member 13c separates from the valve seat 28, and thus the valve port 26 is opened.

The main valve body 13 configured as described above forms a housing space 35 with the guide member 12 in order to house a first coil spring 16. Specifically, in the guide member 12, the inner hole 12a has one end portion 12b formed smaller in diameter than a remaining portion 12c, and the leading end portion 13a of the main valve body 13 is inserted through the one end portion 12b. Thus, the housing space 35 in the approximate shape of a circular ring is formed between the leading end portion 13a of the main valve body 13 and the guide member 12, and the first coil spring 16 is housed in the housing space 35. The first coil spring 16 is what is called a compression coil spring and provides, to the main valve body 13, a biasing force in an opening direction from the closed position to the open position. Note that the first coil spring 16 can be replaced by a leaf spring, an elastic body, a magnetic spring, a pneumatic spring, a pressing mechanism that uses an electrostatic force, or the like.

Furthermore, in the main valve body 13, a pilot passage 13d is formed to allow communication between the first port 22 and the second port 24 when the main valve body 13 is in the closed position. The pilot passage 13d passes through the main valve body 13 along the axial line thereof, and when the main valve body 13 is seated, connects the valve port 26 and an inner hole 13e of the main valve body 13. Moreover, in order to open and close the pilot passage 13d, the seat piston 14 is inserted through the inner hole 13e of the main valve body 13 in such a manner as to be axially movable and located adjacent to the housing space 35.

The seat piston 14 is formed in the approximate shape of a circular column, and closes the pilot passage 13d by inserting a leading end 14a of the seat piston 14 into a seat portion 13f of the pilot passage 13d and causing the leading end 14a to be seated. In other words, as a result of the seat piston 14 being positioned in a pilot closed position, the pilot passage 13d is closed. Furthermore, the seat piston 14 can move from the pilot closed position to a pilot open position along the axial line of the seat position 14, and when the seat piston 14 moves, the leading end 14a separates from the seat portion 13f. Accordingly, the pilot passage 13d is opened, and the valve port 26 and the inner hole 13e of the main valve body 13e are brought into communication. Furthermore, a plurality of slits (in the present embodiments, two slits) 14b, 14b are formed in the outer peripheral surface of the seat piston 14, and the slits 14b, 14b form channels connecting the pilot passage 13d and the aforementioned two communication channels 33, 34 when the pilot passage 13d is open. The seat piston 14 configured as just described has a base end portion 14c protruding from the main valve body 13, and the electromagnetic drive device 15 is provided on this protrusion.

The electromagnetic drive device 15 includes a plunger 41, a stationary pole 42, and a solenoid 43. The plunger 41 is a member in the approximate shape of a circular cylinder that is made of a magnetic material, and the base end portion 14c of the seat piston 14 is inserted through an inner hole 41a of the plunger 41. Furthermore, in the inner hole 41a, a leading end portion 41b is formed smaller in diameter than the base end portion 41c, and accordingly a base end 14d of the seat piston 14 is formed larger in diameter than the remaining portion. Thus, the plunger 41 engages the base end 14d of the seat piston 14 at the leading end portion of the inner hole 41a of the plunger 41 and is configured to move in conjunction with the seat piston 14. The stationary pole 42 is provided so as to face the plunger 41 configured as just described.

The stationary pole 42 is a member in the approximate shape of a circular column that is made of a ferromagnetic material and is disposed apart from the base end of the plunger 41 in one axial direction. The outer diameter of a leading end portion 42b of the stationary pole 42 disposed as just described is approximately equal to the outer diameter of the plunger 41, and a sleeve 44 is provided surrounding the leading end portion 42b of the stationary pole 42 and the plunger 41. The sleeve 44 is a member in the approximate shape of a circular cylinder that is made of a non-magnetic material and is configured so that the plunger 41 can move axially in the sleeve 44. The solenoid 43 is provided surrounding the sleeve 44 configured as just described.

The solenoid 43 is formed in the approximate shape of a circular column and can generate an excitation force for the plunger 41 by passing an electric current to a coil 43b wound on a bobbin 43a. Specifically, the solenoid 43 can excite the plunger 41 so that the plunger 41 is attracted to the stationary pole 42, and thus can move the seat piston 14, which moves in conjunction with the plunger 41, to the pilot open position by the attraction. Furthermore, in order to provide a biasing force opposing the excitation force to the plunger 41 (more specifically, to the plunger 41 via the seat piston 14), a second coil spring 17 is provided on the plunger 41.

The second coil spring 17, which is one example of the basing member, is what is called a compression coil spring and is inserted through the plunger 41. Specifically, the inner hole 41a of the plunger 41 forms a spring housing chamber 45 together with a spring bearing recess 42a of the stationary pole 42 to be described later, and the second coil spring 17 is housed in the spring housing chamber 45. The second coil spring 17 has one end fitted into the spring bearing recess 42a of the stationary pole 42 and the other end pressed against the base end 14d of the seat piston 14. Therefore, the second coil spring 17 biases the plunger 41 via the seat piston 14 in one axial direction and pulls the plunger 41 away from the stationary pole 42. Furthermore, as a result of being pressed against the seat piston 14, the second coil spring 17 enables the plunger 41 and the seat piston 14 to move in conjunction with each other, and positions the seat piston 14 in the pilot closed position in the state where no electric current flows through the solenoid 43. Moreover, the second coil spring 17 provides a biasing force acting in a closing direction from the open position to the closed position to the seat piston 14 via the main valve body 13 and positions the main valve body 13 in the closed position. Note that the second coil spring 17 can be replaced by a leaf spring, an elastic body, a magnetic spring, a pneumatic spring, a pressing mechanism that uses an electrostatic force, or the like.

The outer peripheral surface of the solenoid 43 is formed larger in diameter at the base end than at the remaining portion, and an annular channel 29 in the shape of a circular ring is formed between the remaining portion and the housing 11. The annular channel 29 is connected to the second port 24 via the second channel 25, is connected to the first port 22 via the gaps 27, 27, the communication channels 31, 32, and the first channel 23, and forms a valve passage 30 together with these channels 23, 25, 27, 27, 31, 32.

In the gas solenoid valve 1 configured as described above, the spring housing chamber 45 is configured as follows. Specifically, the spring housing chamber 45 is formed by fitting the plunger 41 and the leading end portion 42b of the stationary pole 42 into the sleeve 44 and inserting the seat piston 14 through the leading end portion 41b of the plunger 41; the spring housing chamber 45 is basically isolated from the other space. Meanwhile, a gap 48 is formed between the leading end portion 41b of the plunger 41 and the base end portion 14c of the seat piston 14. The spring housing chamber 45 is connected to the valve passage 30 via this gap 48, and gas is introduced into and discharged from the spring housing chamber 45 mainly via the gap 48 (refer to the arrow A in FIG. 3). This gap 48 is formed so as to have a width S between 0.01 mm and 0.5 mm, inclusive, in order to limit the amount of gas to be introduced into and discharged from the spring housing chamber 45. With this, abrupt changes in the volume of the spring housing chamber 45 are minimized, and the spring housing chamber 45 has a damping function, in other words, the spring housing chamber 45 plays the role of the damping chamber 46.

Furthermore, a stopper 47 is provided on a leading end surface of the plunger 41. The stopper 47 is formed in the approximate shape of a circular ring and protrudes from the leading end surface of the plunger 41 toward the main valve body 13. When the main valve body 13 moves a predetermined distance L from the closed position in the opening direction, the stopper 47 configured as just described comes into contact with a base end surface of the main valve body 13. Specifically, when the main valve body 13 moves the predetermined distance L, the stopper 47 limits the movement of the main valve body 13 (in other words, limits the amount of movement). With this, it is possible to minimize damage to the second coil spring 17 that occurs due to excessive stroke of the main valve body 13.

Figure 4:
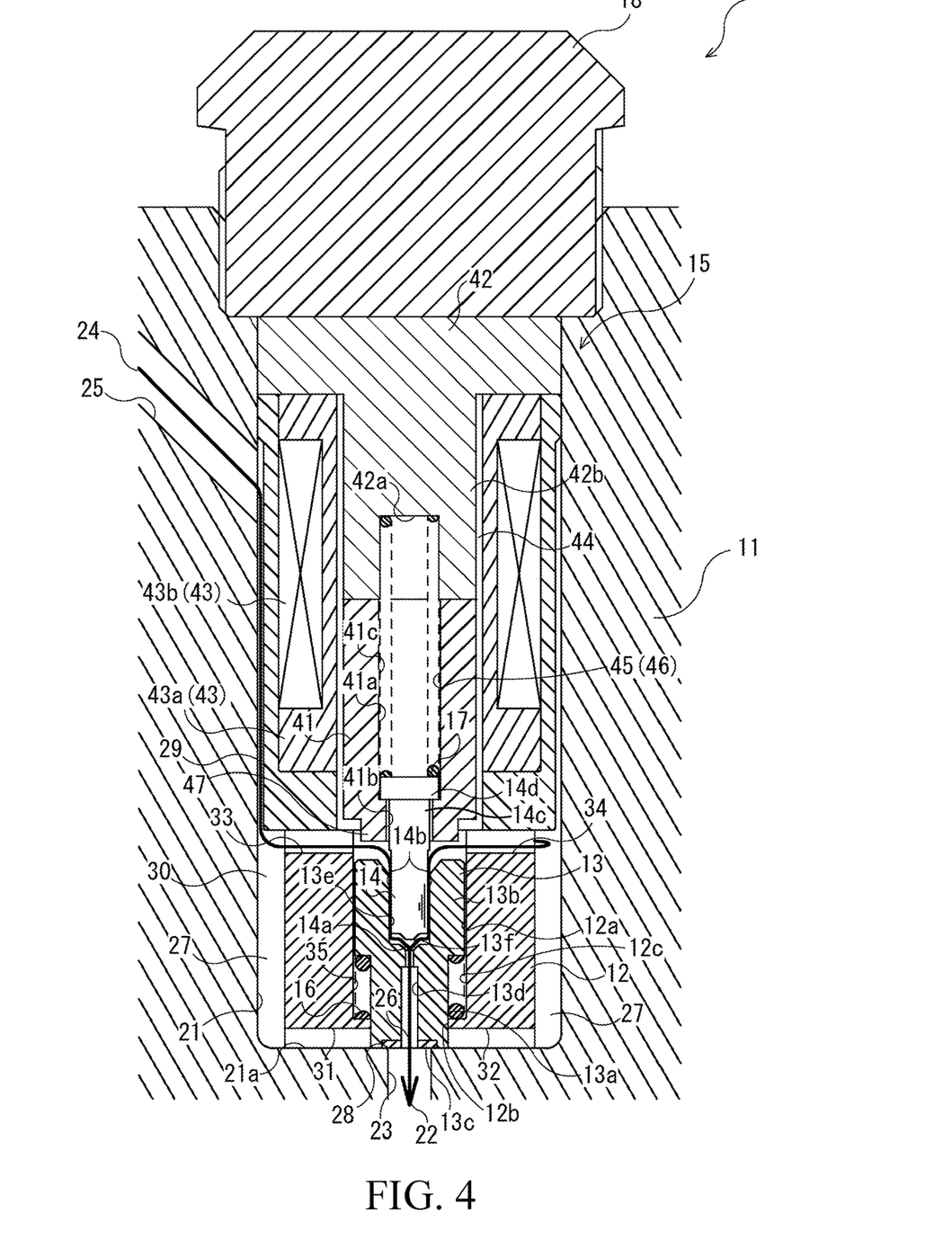
FIG. 4 is a cross-sectional view of the gas solenoid valve in FIG. 1 when gas is supplied from a second port to a first port.

The operation of the gas solenoid valve 1 will be described below. Specifically, as mentioned above, the gas solenoid valve 1 is provided on the gas tank and can cause the gas to flow in both directions in the valve passage 30 in order to fill the gas tank with the gas and discharge the gas from the gas tank, for example. For example, to cause the gas to flow from the second port 24 to the first port 22 as illustrated in FIG. 4, an electric current flows to the coil 43b of the solenoid 43. Therefore, the plunger 41 is lifted up, and the seat piston 14 moves to the pilot open position accordingly. Thus, the pilot passage 13d is opened, and the gas is guided to the first channel 23 through the two communication channels 33, 34, the slits 14b, 14b, and the pilot passage 13d. As a result, the difference in pressure between the gas in the valve chamber 21 and the gas flowing in the first channel 23 is reduced, and the main valve body 13 is eventually pushed up to the open position by the first coil spring 16. Thus, the valve port 26 is opened, meaning that the valve passage 30 is opened, and the gas flows from the second port 24 to the first port 22 via the valve passage 30. Subsequently, when the electric current stops flowing to the coil 43b, the second coil spring 17 pushes the main valve body 13 via the seat piston 14, and the main valve body 13 moves to the closed position. Thus, the valve port 26 is closed, meaning that the valve passage 30 is closed, and the gas stops flowing.

Figure 5:
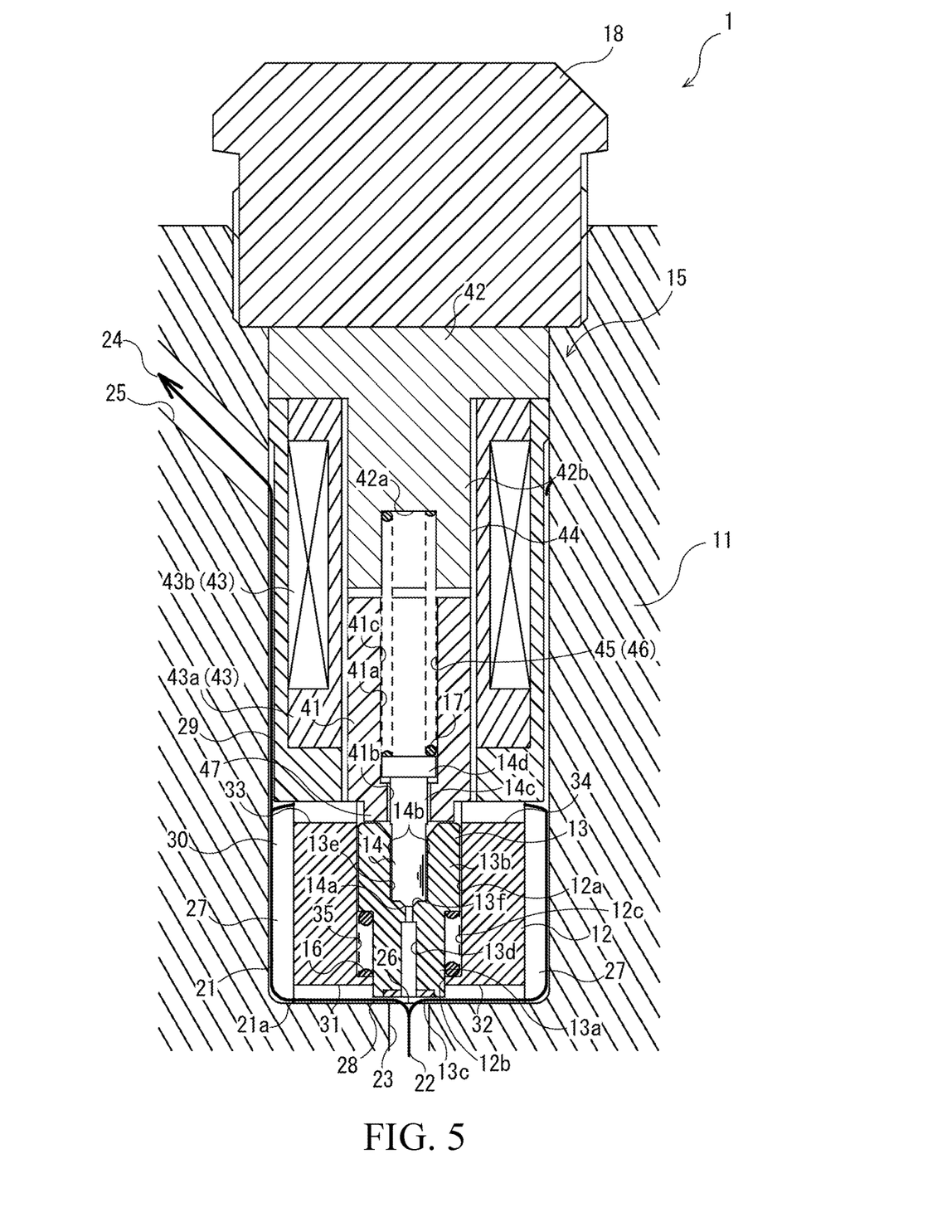
FIG. 5 is a cross-sectional view of the gas solenoid valve in FIG. 1 when gas is supplied from the first port to the second port.

On the other hand, to cause the gas to flow from the first port 22 to the second port 24 as illustrated in FIG. 5, the gas solenoid valve 1 operates as follows. Specifically, when the gas flows from the first port 22 to the first channel 23, the main valve body 13 is pushed in the opening direction by the pressure of the gas. Thus, the main valve body 13 moves to the open position, and the valve port 26 is opened, meaning that the valve passage 30 is opened. As a result, the gas flows mainly from the first channel 23 to each of the communication channels 31, 32 through the valve port 26, and is guided further to the second channel 25 through the gaps 27, 27 and the annular channel 29. The gas supplied to the first port 22 in this manner is guided to the second port 24 via the valve passage 30. In the case where the valve passage 30 is opened as a result of the main valve body 13 being moved by the gas supplied to the first port 22 in this manner, the load acting on the main valve body 13 changes according to the degree of opening of the valve passage 30, and thus the main valve body 13 vibrates, in other words, chattering occurs at the main valve body 13. Regarding this issue, in the gas solenoid valve 1, the occurrence of chattering at the main valve body 13 is minimized in the following manner.

Specifically, in the gas solenoid valve 1, when the main valve body 13 is lifted up by the gas supplied to the first port 22, the seat piston 14 is lifted up together. Accordingly, the seat piston 14 seated on the leading end portion 41b of the plunger 41 separates from the leading end portion 41b, and the damping chamber 46 is connected to the valve passage 30 via the gap 48 (refer to the arrow in FIG. 3). In this manner, the gas is introduced into and discharged from the damping chamber 46 mainly via the gap 48; as a result, abrupt changes in the volume of the damping chamber 46 are minimized while extension and retraction thereof are allowed, and thus vibrations of the seat piston 14 and the main valve body 13 can be damped. Therefore, it is possible to minimize the occurrence of chattering at the main valve body 13.

Note that the main valve body 13 vibrates integrally with the seat piston 14, and in some cases, the plunger 41, and chattering occurs at the seat piston 14 and the plunger 41 as well. Regarding this, the damping chamber 46 minimizes the vibrations of not only the main valve body 13, but also the seat piston 14 and the plunger 41 and thus can minimize the occurrence of chattering at these elements.

In the above-described manner, in the gas solenoid valve 1, by supplying gas from the first port 22 to the first channel 23, it is possible to open the valve port 26 and cause the gas to flow to the second port 24, and at this time, the occurrence of chattering at the main valve body 13 can be minimized. Furthermore, by stopping the gas supply from the first port 22 to the first channel 23, the main valve body 13 is pushed by the second coil spring 17 and moves to the closed position as in the case where the gas flows from the second port 24. Thus, the valve port 26 is closed, meaning that the valve passage 30 is closed, and the gas stops flowing. In the gas solenoid valve 1, it is possible to cause gas to flow from both the first port 22 and the second port 24 as described above.

In the gas solenoid valve 1 configured as described above, the spring housing chamber 45 is used as the damping chamber 46, meaning that there is no need to form another damping chamber 46 to damp vibrations of the seat piston 14 and the main valve body 13. Therefore, it is possible to avoid an increase in the size of the gas solenoid valve 1. Furthermore, the amount of gas to be introduced into and discharged from the damping chamber 46 can be changed according to the width S of the gap 48, and thus it is possible to adjust the damping force of the damping chamber 46 according to the width S of the gap 48. Therefore, by adjusting the width S, it is possible to minimize the occurrence of chattering at the main valve body 13 and the seat piston 14 more effectively.

Other Embodiments

In the gas solenoid valve 1 according to the present embodiment, the spring housing chamber 45 is used as the damping chamber 46, but does not necessarily need to be formed in such a manner. For example, the housing space 35 may have the same function as the damping chamber 46, or another damping chamber 46 may be formed separately. Furthermore, in the gas solenoid valve 1 according to the present embodiment, the amount of gas to be introduced into and discharged from the damping chamber 46 is adjusted according to the width S of the gap 48, but the gas may be actively introduced into and discharged from the damping chamber 46 through the area between the sleeve 44 and the plunger 41. In this case, by adjusting the distance between the leading end portion 42b of the stationary pole 42 and the plunger 41, it is possible to adjust the amount of gas to be introduced and discharged, and the damping force of the damping chamber 46 can be adjusted accordingly.

Figure 6:
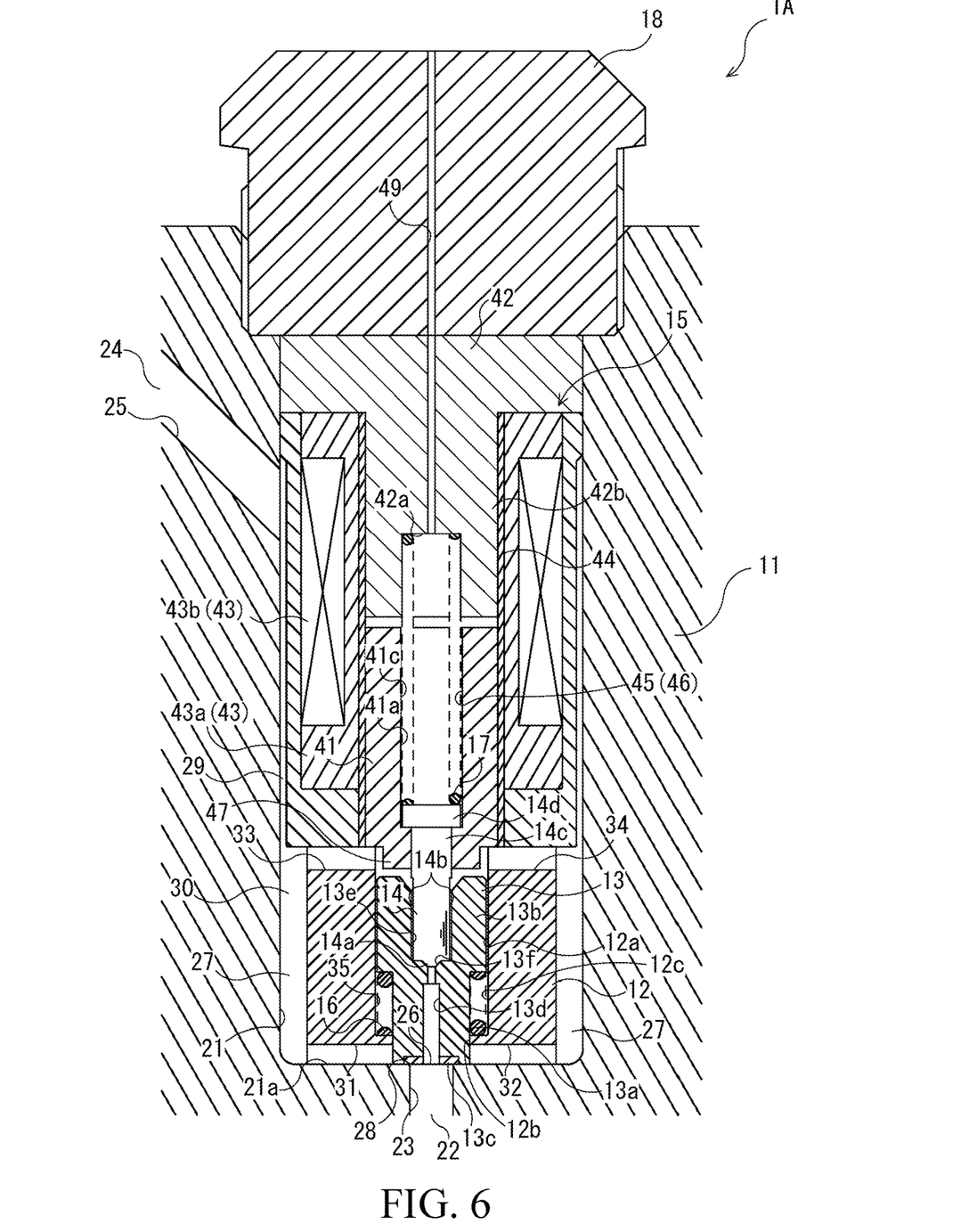
FIG. 6 is a cross-sectional view of a gas solenoid valve according to another embodiment.

Furthermore, instead of the gap 48, a damping passage 49 may be formed as can be seen in a gas solenoid valve 1A illustrated in FIG. 6. Specifically, the damping passage 49 is formed through the stationary pole 42 and the lid body 18 in order to connect the damping chamber 46 to the outside, and gas is introduced into and discharged from the damping chamber 46 through the damping passage 49. Also in this case, by adjusting the diameter of the damping passage 49, it is possible to adjust the amount of gas to be introduced and discharged, and the damping force of the damping chamber 46 can be adjusted accordingly. Note that the gas solenoid valve 1A has substantially the same configuration as the gas solenoid valve 1 except the damping passage 49; in FIG. 6, the same elements share the same reference signs. The same applies to a gas solenoid valve 1B to be described later. Furthermore, the damping passage may be formed in the seat piston 14; in this case, the damping passage is formed so that the damping chamber 46 and the communication channels 33, 34 are connected to each other through the damping passage.

Figure 7:
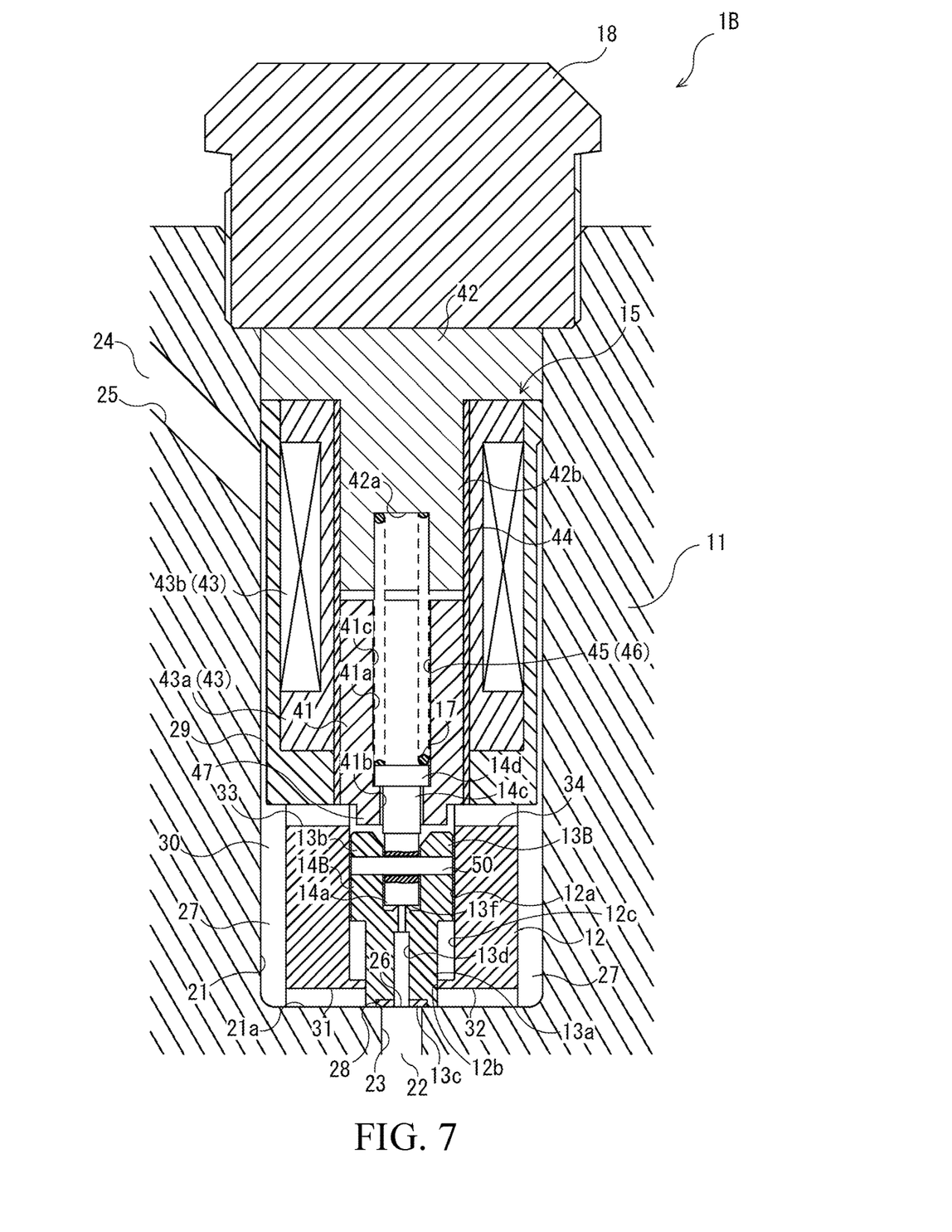
FIG. 7 is a cross-sectional view of a gas solenoid valve according to yet another embodiment.

In the gas solenoid valve 1 according to the present embodiment, the seat piston 14 is provided, but is not necessarily required; the gas solenoid valve may be configured so that the plunger 41 is directly pressed against the main valve body 13. Furthermore, as can be seen in a gas solenoid valve 1B illustrated in FIG. 7, a seat piston 14B and a main valve body 13B may be configured to move in conjunction using a pin 50.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTERS LIST 1 gas solenoid valve
11 housing
13 main valve body
13d pilot passage
14 seat piston
15 electromagnetic drive device
16 first coil spring
17 second coil spring
22 first port
24 second port
26 valve port
41 plunger
42 stationary pole
43 solenoid
45 spring housing chamber
46 damping chamber
47 stopper

The invention claimed is:

1. A gas solenoid valve, comprising:
a housing including a first port, a second port, and a valve port leading to the first port and the second port;
a main valve body capable of moving between a closed position and an open position and configured to move in an opening direction by pressure of gas supplied through the first port, the closed position being a position of the main valve body closing the valve port, the open position being a position of the main valve body opening the valve port;
a biasing member that provides a biasing force to the main valve body to position the main valve body in the closed position, the biasing force acting in a closing direction from the open position to the closed position;
a seat piston that is inserted through the main valve body, receives the biasing force of the biasing member, and biases the main valve body to the closed position; and
an electromagnetic drive device that generates an excitation force to cause the main valve body to move to the open position, the excitation force opposing the biasing force of the biasing member, wherein
a pilot passage connecting the first port and the second port is formed in the main valve body,
the seat piston is capable of moving between a pilot closed position and a pilot open position, the pilot closed position being a position of the seat piston closing the pilot passage, the pilot open position being a position of the seat piston opening the pilot passage,
the electromagnetic drive device includes a plunger through which the seat piston is inserted in a manner to be movable in conjunction, a stationary pole disposed facing the plunger, and a solenoid that provides the excitation force to the plunger to attract the plunger to the stationary pole to cause the seat piston to move to the pilot open position and cause the main valve body to move to the open position,
a damping chamber that damps movement of the main valve body is formed in the plunger, and
the damping chamber that is adjacent to the seat piston and located in the opening direction of the main valve body relative to the main valve body introduces and discharges gas through a gap between the seat piston and the plunger.

2. The gas solenoid valve according to claim 1, wherein:
the biasing member is disposed in the damping chamber.

3. The gas solenoid valve according to claim 1, further comprising:
a stopper that limits an amount of movement of the main valve body in the opening direction.

* * * * *